United States Patent
Cheng

(10) Patent No.: US 9,185,340 B2
(45) Date of Patent: Nov. 10, 2015

(54) DISPLAY METHOD AND ASSOCIATED APPARATUS

(71) Applicant: MStar Semiconductor, Inc., Hsinchu County (TW)

(72) Inventor: Kun-Nan Cheng, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 0 days.

(21) Appl. No.: 14/037,497

(22) Filed: Sep. 26, 2013

(65) Prior Publication Data
US 2014/0086552 A1 Mar. 27, 2014

(30) Foreign Application Priority Data
Sep. 27, 2012 (TW) .............................. 101135553 A

(51) Int. Cl.
H04N 5/775 (2006.01)
H04N 7/088 (2006.01)
G11B 27/30 (2006.01)
H04N 21/431 (2011.01)
H04N 5/445 (2011.01)
H04N 21/44 (2011.01)
H04N 21/4402 (2011.01)
H04N 21/462 (2011.01)
H04N 21/488 (2011.01)
H04N 7/01 (2006.01)

(52) U.S. Cl.
CPC .......... *H04N 7/0882* (2013.01); *G11B 27/3027* (2013.01); *H04N 5/445* (2013.01); *H04N 21/4312* (2013.01); *H04N 21/4316* (2013.01); *H04N 21/44008* (2013.01); *H04N 21/440272* (2013.01); *H04N 21/4621* (2013.01); *H04N 21/4884* (2013.01); *H04N 7/0122* (2013.01); *H04N 2005/44526* (2013.01)

(58) Field of Classification Search
CPC .......... H04N 21/4884; H04N 21/4316; H04N 5/44504; H04N 2005/44526; H04N 13/0018; H04N 9/8715; H04N 13/007; H04N 13/0003
USPC ............................. 386/248, 232, 230; 348/42
See application file for complete search history.

(56) References Cited

U.S. PATENT DOCUMENTS

| 6,046,778 | A  | * | 4/2000  | Nonomura et al. | ........... 348/565 |
|-----------|----|---|---------|-----------------|---------------------|
| 2007/0280295 | A1 | * | 12/2007 | Uchimura | ...................... 370/485 |
| 2009/0002311 | A1 | * | 1/2009  | Barnhoefer | ........... G09G 3/3406 345/102 |
| 2009/0289968 | A1 | * | 11/2009 | Yoshida | ........................ 345/691 |
| 2009/0303383 | A1 | * | 12/2009 | Hamada et al. | ................ 348/468 |

(Continued)

FOREIGN PATENT DOCUMENTS

WO 2010064118 6/2010

OTHER PUBLICATIONS

Taiwan Patent Office, "Office Action," Apr. 9, 2015.

*Primary Examiner* — Helen Shibru
(74) *Attorney, Agent, or Firm* — WPAT, PC; Justin King

(57) ABSTRACT

A display apparatus and associated method are provided. The display apparatus receives a display frame having an output width-height ratio, and outputs an image frame according to a screen width-height ratio. The output width-height ratio is different from the screen width-height ratio. The display method includes obtaining an image region and a subtitle region from the display frame, generating a subtitle according to the subtitle region, generating the image frame according to the image region, and displaying the image frame and the subtitle.

19 Claims, 7 Drawing Sheets

(56) References Cited

U.S. PATENT DOCUMENTS

| | | | |
|---|---|---|---|
| 2010/0182345 A1* | 7/2010 | Shimoshikiryoh | H01L 29/66757 345/690 |
| 2010/0220175 A1* | 9/2010 | Claydon et al. | 348/43 |
| 2010/0225674 A1* | 9/2010 | Choe | G09G 3/3406 345/690 |
| 2010/0265262 A1* | 10/2010 | Choe | G09G 3/342 345/589 |
| 2011/0242104 A1* | 10/2011 | Zhang et al. | 345/419 |
| 2013/0307945 A1* | 11/2013 | Cheng | H04N 13/007 348/54 |
| 2014/0257995 A1* | 9/2014 | Wang | H04N 21/44008 705/14.66 |

* cited by examiner

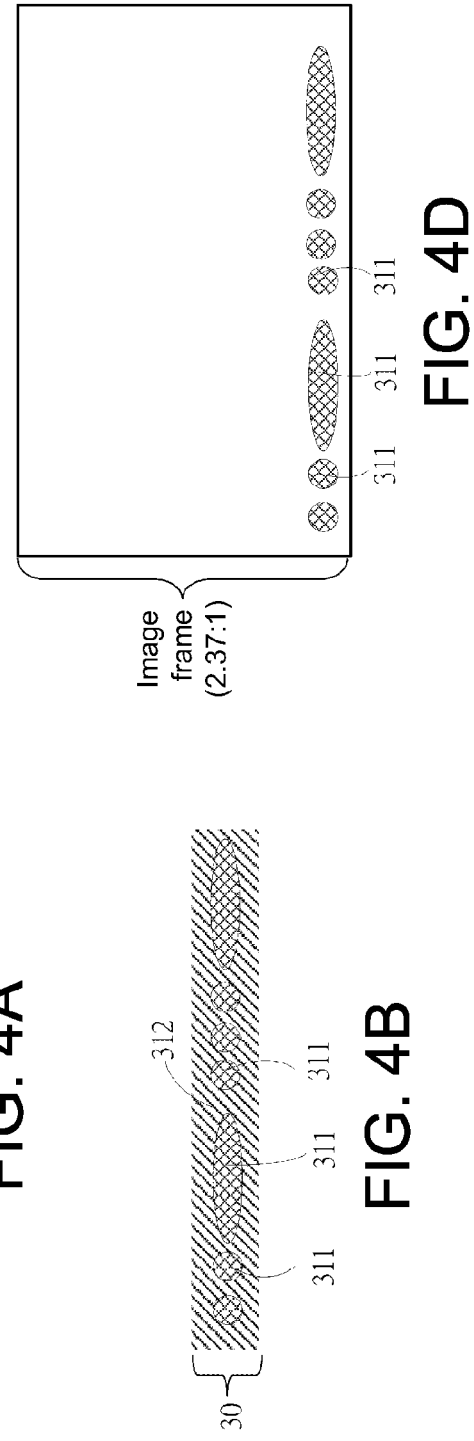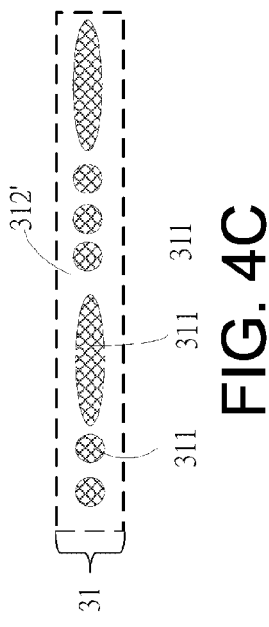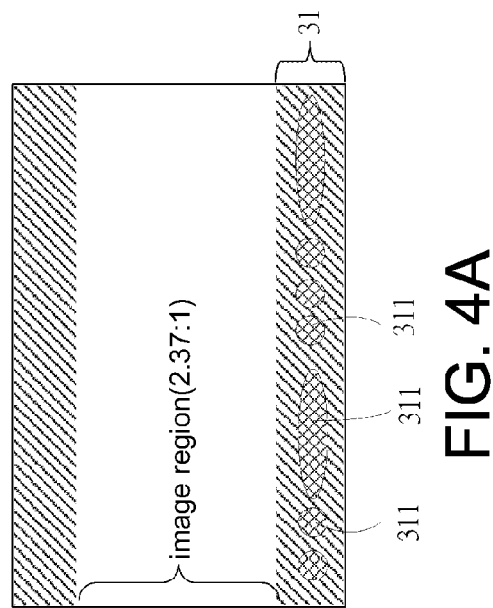

DISPLAY METHOD AND ASSOCIATED APPARATUS

This application claims the benefit of Taiwan application Serial No. 101135553, filed Sep. 27, 2012, the subject matter of which is incorporated herein by reference.

BACKGROUND OF THE INVENTION

1. Field of the Invention

The invention relates in general to a display method and associated apparatus, and more particularly, to a display method and associated apparatus capable of adjusting display settings of a subtitle region.

2. Description of the Related Art

When playing an optical disk with a display apparatus and an optical disk drive, a display region of the image frames is frequently limited by an actual display size of the display apparatus. Further, a width-height ratio of a panel of the display apparatus (i.e., a screen width-height ratio) also affects visual effects of a user viewing the image frames.

FIG. 1A shows a schematic diagram of a display frame of a common display device. In a common display apparatus, 16:9 is usually selected as the screen width-height ratio as it renders most comfortable visual sensations to the human eyes. Moreover, the 16:9 screen width-height ratio presents more realistic image frames with minimal distortion.

However, when image frames are initially captured and then recorded in a DVD, the 16:9 ratio is rarely adopted as the recording width-height ratio. FIG. 1B shows a schematic diagram of a recording width-height ratio when recording an image frame. In FIG. 1B, a recording width-height ratio 2.37:1 is taken as an example.

Comparing FIGS. 1A and 1B, it is seen that a width and a height of a screen of a common display device are closer, whereas a width and a height for recording an image frame have a greater difference in a way that a recorded image frame appears flatter. Hence, it can be concluded that the recording width-height ratio for recording an image frame does not match a screen width-height ratio that a display device utilizes for displaying the image frame.

Thus, when outputting an image frame by a DVD player to a display device, instead of directly outputting the 2.37:1 image frame to the display device, the DVD player converts the image frame to an output width-height ratio for actually outputting a display frame. The output width-height ratio of the DVD player is a width-height ratio of the display frame output by the DVD player, and usually matches a common screen width-height ratio (16:9).

Comparing FIGS. 1A and 1B, it is also seen that, when the display frame in a screen width-height ratio of 16:9 has a same image width as the image frame having a recording width-height ratio of 2.37:1, the height of the display frame and greater than the height of the image frame.

As a result, when the DVD player displays a 16:9 display frame obtained by adjusting a 2.37:1 recorded image frame, certain parts of the display frame appear blank due to different heights of the frames. That is, a region of the image frame is smaller such that the display frame cannot be entirely filled.

An actual width-height ratio is given as an example for explaining a cause of the unfilled frame.

Assume that an image frame is recorded using a 2.37:1 recording width-height ratio, and a display apparatus conforms a 1080P (1920×1080) standard. Further, when displaying the image frame on the display apparatus, a horizontal resolution maintained at 1920 pixels is desired.

To maintain the horizontal resolution at 1920 pixels as well as to match the 2.37:1 recording width-height ratio, a vertical resolution of approximately 810 (1920/2.37) pixels is required.

As such, the display apparatus displays image data of 1080 pixels in the horizontal direction and image data of only 810 pixels in the vertical direction. That is, the image data of the image frame with respect to the vertical direction is insufficient for the display apparatus. Correspondingly, a playback apparatus such as a DVD player additionally fills black edges to upper and lower sides of the image frame to make up the insufficient image data in the vertical direction.

In other words, comparing a 16:9 output width-height ratio and a 2.37:1 recording width-height ratio, an image frame of the latter appears wider and flatter. To maintain the consistency in the horizontal resolution when a playback apparatus outputs a display frame, black edges need to be filled at upper and lower sides of the image frame to make up insufficient ranges of the image frame.

FIG. 1C shows a schematic diagram of a conventional playback apparatus adjusting a display frame to a 16:9 output width-height ratio. In FIG. 1C, an actual width-height ratio of the blank region (representing an image frame) and a display width-height ratio of a cinema display system are both 2.37:1. Further, a display frame represented by the entire region has a 16:9 output width-height ratio.

When a playback apparatus adopts a 16:9 output width-height ratio, black edges are resulted at upper and lower sides of an image frame due to a greater height. It should be noted that, a playback apparatus such as a DVD player often further utilizes a lower black region as a subtitle region, and jointly provides the image frame and the subtitle region to a display apparatus.

As previously stated, the display frame outputted by a DVD player has a 16:9 output width-height ratio, which is consistent with a screen width-height ratio of the display apparatus in this example. Hence, the image frame actually displayed by a display device is also consistent with the display frame. That is to say, even when the recording width-height ratio does not match the screen width-height ratio of the display apparatus, a common display apparatus is still able to normally display the image frame through conversion provided by the DVD player.

A cinema display system is market-available for rendering a screen width-height ratio of a display apparatus to be more approximate to a recording width-height ratio adopted in film-making.

FIG. 2A shows a schematic diagram of a screen width-height ratio provided by a cinema display system. The screen width-height ratio of the cinema display system is about 2.37:1, which is different from that of a common display apparatus.

As seen from previous descriptions, a current DVD always adjusts a width-height ratio of an image frame. In reality, a current DVD is unable to learn in advance the type of display device and the screen width-height ratio to be applied, and usually supports only a 16:9 width-height ratio output. In other words, when utilizing a cinema display system having a 2.37:1 width-height ratio, a DVD player nonetheless adjusts an output width-height ratio of a display frame to 16:9.

FIG. 2B shows a schematic diagram of a conventional playback apparatus, after adjusting an output width-height ratio of a display frame to 16:9, displaying an image frame in conjunction with a cinema display system. Based on the foregoing descriptions, it is learned that FIG. 2B represents a display frame adjusted by a DVD player. The right side of FIG. 2B is in equivalence to a display frame displayed by a cinema display system having a 2.37:1 screen width-height ratio in FIG. 2A.

The display frame output by the DVD player includes the image frame in a 2.37:1 width-height ratio and black regions at upper and lower sides. The playback apparatus utilizes the lower black region as a subtitle region.

Theoretically, the image frame included in the display frame has a 2.37:1 width-height ratio, and the screen width-height ratio of the cinema display system is also 2.37:1. Thus, the cinema display system may directly and proportionally scale up the image frame for display, as shown by the arrows in FIG. 2B.

Although the method of proportionally scaling up image data of the pixels is distortion-free, such method may derive other issues. In short, the cinema display system properly scales up the image frame but has deficiencies in the presentation of a subtitle region.

FIG. 2C shows a schematic diagram of a subtitle region in a display frame. As previously described, contents of the subtitle region need to be additionally provided when the cinema display system directly and proportionally scales up the 2.37:1 image frame. Thus, as shown in FIG. 2C, in the prior art, for example, the subtitle region may first be extracted from the display frame. As shown in FIG. 2D, the subtitle region and the scaled up display frame may be together displayed. That is, while displaying the image frame, the subtitle region is superimposed on the image frame for display.

As seen from FIG. 2D, although a cinema display system adopting the above approach is distortion-free since the image frame is proportionally scaled up, a part of the image frame is however covered by the subtitle region. As a result, a cinema display system adopting the above approach is incapable of presenting an intact image frame.

Therefore, there is a need for a solution for processing and presenting a subtitle when displaying a display frame by a cinema display system.

SUMMARY OF THE INVENTION

According to an aspect of the present invention, a display method is provided. The display apparatus receives a display frame having an output width-height ratio and displays an image frame according to a screen width-height ratio. The output width-height ratio is different from the screen width-height ratio. The display method comprises: obtaining an image region and a subtitle region from the display frame; generating a subtitle according to the subtitle region; generating the image frame according to the image region; and displaying the image frame and the subtitle.

According to another aspect of the present invention, a display apparatus is provided. The display apparatus, signally connected to an image playback apparatus, receives a display frame having an output width-height ratio and displays an image frame according to a screen width-height ratio. The output width-height ratio is different from the screen width-height ratio. The display apparatus comprises: a reception unit, signally connected to the image playback apparatus, configured to receive the display frame from the image playback apparatus; a control unit, coupled to the reception unit, configured to obtain an image region and a subtitle region from the display frame, and generate a subtitle according to the subtitle region; and a panel, coupled to the control unit, configured to generate the image frame according to the image region.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIGS. 4A, 4B, 4C and 4D are schematic diagrams of changing display settings of a subtitle region and displaying an image frame in the present invention.

DETAILED DESCRIPTION OF THE INVENTION

The present invention is directed to a solution for solving the width-height ratio inconsistency between a display frame and a display panel, so as to satisfy requirements of a display ratio and an intact display frame (including a display frame and a subtitle region).

In the following illustrations for converting width-height ratios between a display frame and an image frame, it is assumed in the accompanying drawings that, the display frame output by a playback apparatus has a 16:9 output width-height ratio, and both of a screen width-height ratio of a display apparatus (a cinema display system) and a width-height ratio of the image frame are 2.37:1. Further, the width of the display frame is greater than the height of the display frame, the width of the panel is greater than the height of the panel, and the output width-height ratio is smaller than the screen width-height ratio.

It should be noted that, the concept of the present invention is applicable to other playback apparatuses, display apparatuses and image frames having different width-height ratios, and associated details shall not again be described.

The display frame outputted by the playback apparatus has a 16:9 width-height ratio. However, a new-type cinema display device may utilize a 2.37:1 width-height ratio. The display frame comprises both an image region and a subtitle region, with the image region with the subtitle region being already combined in the display frame outputted by the playback apparatus. As such, the display apparatus passively receives the entire display frame with no knowledge of boundaries between the image region and the subtitle region.

A concept of the present invention is that, a display frame is first divided into an image region and a subtitle region, and display methods for the two regions are respectively adjusted to generate an image frame and a subtitle. The image frame and the subtitle are combined to form a final display frame.

Details for dividing a display frame into an image region and a subtitle region are described with reference to FIGS. 3A, 3B and 3C.

Figure 1A:
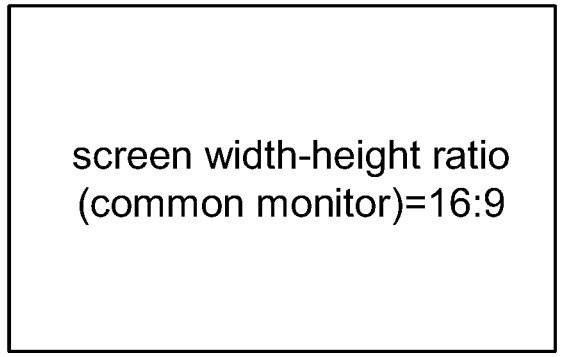
FIG. 1A is a schematic diagram of a display frame of a common display device.
Figure 1B:
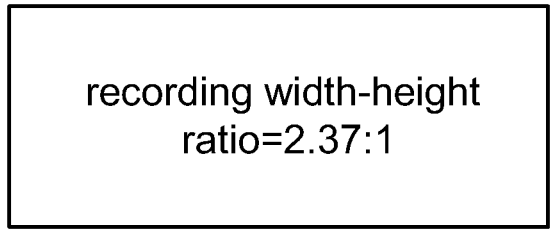
FIG. 1B is a schematic diagram of a recording width-height ratio for recording an image frame.
Figure 1C:
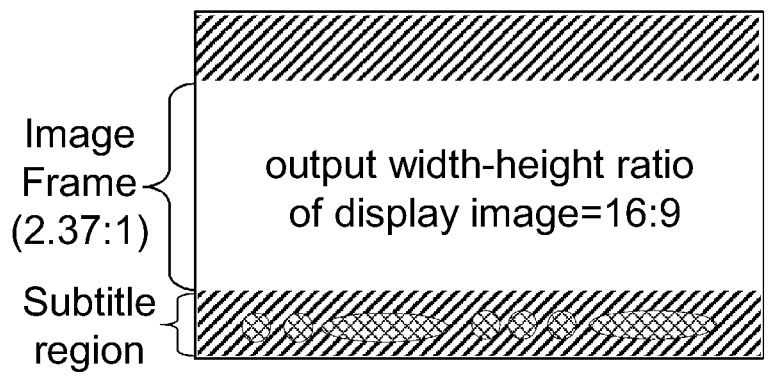
FIG. 1C is a schematic diagram of a conventional playback apparatus adjusting a display frame to a 16:9 output width-height ratio and playing the display frame in conjunction with a common display system.
Figure 2A:
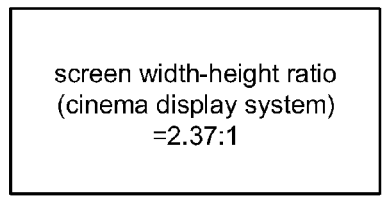
FIG. 2A is a schematic diagram of a screen width-height ratio provided by a cinema display system.
Figure 2B:
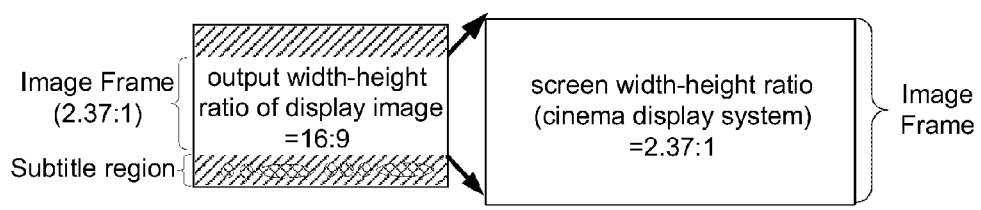
FIG. 2B is a schematic diagram of a conventional playback apparatus, after adjusting an output width-height ratio of a display frame to 16:9, displaying an image frame in conjunction with a cinema display system.
Figure 2C:
FIG. 2C is a schematic diagram of a subtitle region in a display frame.
Figure 2D:
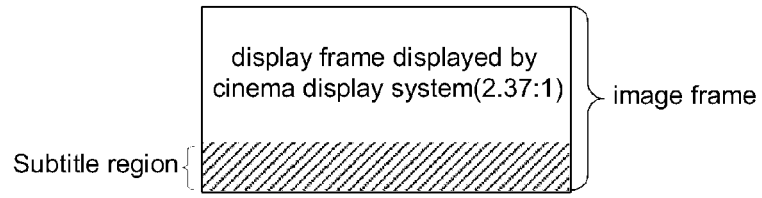
FIG. 2D is a schematic diagram of an image frame superimposed with a subtitle region output to a cinema display system.
Figure 3A:
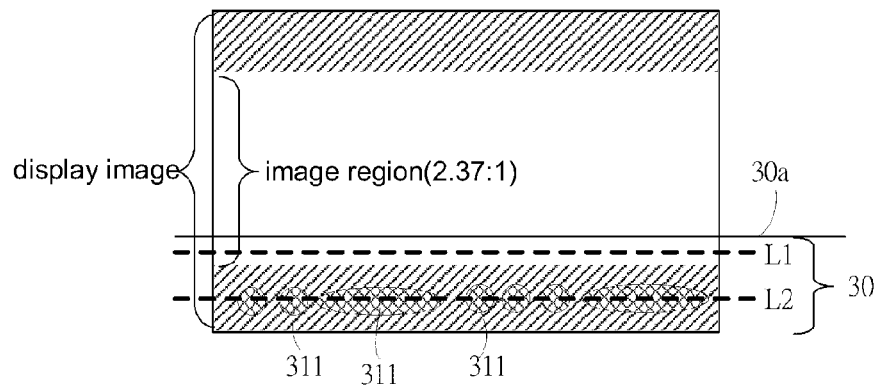
FIG. 3A is a schematic diagram of determining a position of a subtitle region according to a horizontal section obtained from an estimated subtitle region in the present invention.

FIG. 3A shows a schematic diagram of determining a position of a subtitle region according to a horizontal section obtained from an estimated subtitle region in the present invention.

An embodiment of the present invention is described as follows. A predetermined horizontal axis is defined in image data from a source end, and a part of a display frame below the predetermined axis is defined as an estimated subtitle region. The predetermined horizontal axis may be disposed according to a predetermined ratio. For example, the predetermined ratio is ¼ or ⅕ from a lower edge of the display frame, and is an adjustable value.

In an alternative embodiment, a part of the display frame above the predetermined axis may be defined as the estimation subtitle region. That is to say, a plurality of horizontal sections are located at the same side or near the horizontal axis that divides the display frame.

From the predetermined horizontal axis downwards, a plurality of horizontal sections are acquired from the display frame, and pixels on the horizontal sections are obtained, respectively.

On the basis of the horizontal sections, a corresponding relationship between pixels and corresponding grayscale values of the pixels of the same horizontal section may be obtained. Due to different pixels included in different horizontal sections, the corresponding relationship between the pixels and the grayscale values are also different. As a range of the estimated subtitle region is usually slightly larger than an actual display range of the subtitle contents, it means that a horizontal section included in the estimated subtitle region may be located in the subtitle region or the image frame.

Details of determining a position of the subtitle region according to the horizontal sections in the present invention are described with reference to FIGS. 3B and 3C. In the two diagrams, the horizontal axis represents the grayscale value, and the vertical axis represents a pixel count corresponding to each of the grayscale values.

Figure 3B:
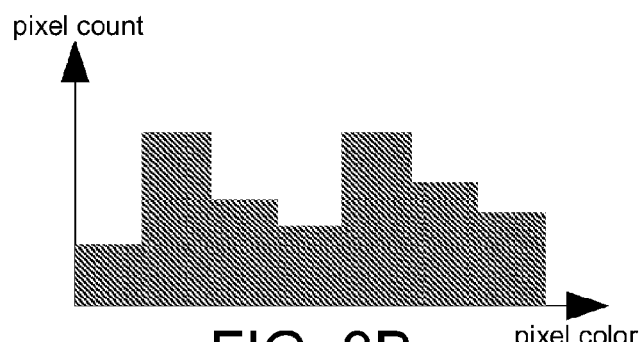
FIG. 3B is a schematic diagram of a grayscale value distribution of pixels in the estimated subtitle region analyzed according to a first horizontal section L1 based on FIG. 3A.

FIG. 3B shows a schematic diagram of a grayscale value distribution of pixels in the estimated subtitle region analyzed according to a first horizontal section L1 based on FIG. 3A. When a horizontal section is located in the image frame, the grayscale values corresponding to the pixels of the horizontal section are more dispersed due to richer colors of the image frame, such that the grayscale value distribution appears as an even distribution, as shown in FIG. 3B.

Based on the above distribution type, it is deduced that the selected position corresponding to the first horizontal section L1 does not contain subtitle contents, and thus the first horizontal section L1 belongs to the image region.

In contrast, when a horizontal section is located at the subtitle region, the grayscale values corresponding to the pixels of the horizontal section are more densely located around certain grayscale values (e.g., a first extremum grayscale value and a second extremum grayscale value), and so the grayscale value distribution appears as a concentrated distribution.

Figure 3C:
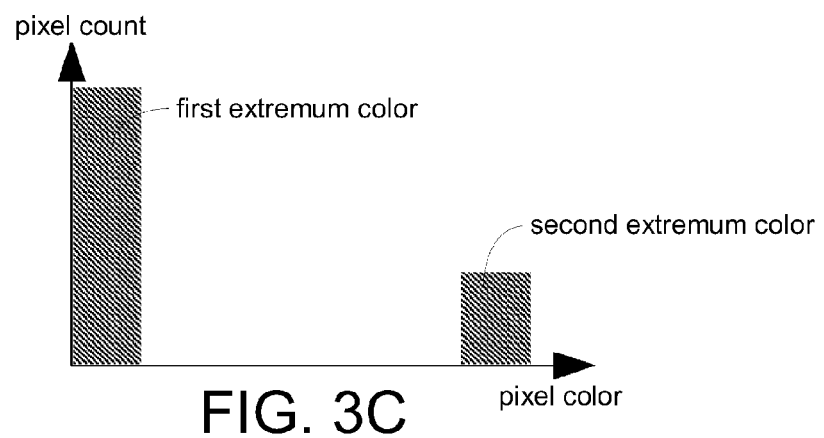
FIG. 3C is a schematic diagram of a grayscale value distribution of pixels in the estimated subtitle region analyzed according to a second horizontal section L2 based on FIG. 3A.

FIG. 3C shows a schematic diagram of a grayscale value distribution of pixels in the estimated subtitle region analyzed according to a second horizontal section L2 based on FIG. 3A.

When the subtitle region displays the subtitle contents, the subtitle contents are presented along with a background color. Thus, as the second horizontal section L2 appears as the concentrated distribution as shown in FIG. 2, it is determined that the second horizontal section L2 belongs to the subtitle region. It should be noted that, the extremum grayscale value of the present invention refers to an extremum value as the pixel count having the grayscale value, and is not limited to grayscale values 0 or 255.

When the grayscale value distribution corresponding to a horizontal section appears as the even distribution in FIG. 3B, it is accordingly determined that the horizontal section excludes an extremum value. Alternatively, when the grayscale values of the pixels of a horizontal section appear as a concentrated distribution in FIG. 3C, from the grayscale value distribution, the grayscale value corresponding to a largest pixel count is regarded as the extremum grayscale value.

The predetermined horizontal axis is usually disposed at a relatively high position to ensure that the estimated subtitle region is greater than the actual subtitle region. Thus, in the horizontal section below the predetermined horizontal axis, the pixels included in a small part of the horizontal section appears as an even distribution, whereas the pixels included in the remaining greater part displays a concentrated distribution.

In other words, when the grayscale values of the pixels included in the horizontal section appears as a concentrated distribution, it means that the horizontal section belongs to the subtitle region. Accordingly, the grayscale value distribution corresponding to the horizontal section may serve as the basis for determining whether the horizontal section is a part of the image region or a part of the subtitle region.

Likewise, a similar method may also be applied to an upper edge of the display frame to determine an actual size of the image region. Associated details may be deduced from the foregoing descriptions, and shall be omitted herein.

In the present invention, the subtitle region may be further divided into a foreground region and a background region according to a first extremum grayscale value and a second extremum grayscale value in FIG. 3C. Thus, the pixels including the first extremum grayscale value in the subtitle region are defined as the foreground region (equivalently the subtitle contents in the subtitle region), and the pixels including the second extremum grayscale value in the subtitle region are defined as the background region (equivalently the background pattern in the subtitle region).

In practice, the step of determining the subtitle region by use of the estimated subtitle region may be repeatedly performed in every display frame of an entire display video, performed only when playing first few display frames of the display video, or performed at an interval after playing a fixed number of display frames.

The range of the estimated subtitle region may be flexibly selected. For example, 1/10 or 1/8 of the vertical height from the lower edge of the display frame is selected as the estimated subtitle region. That is, the predetermined ratio of the estimated subtitle region to the display frame may be adjusted. Further, the range of the estimated subtitle region may be designed according to different types of display frames, or the size of the estimated subtitle region may be modified according to properties of different languages.

Therefore, once the position of the subtitle region is determined, the subtitle region may be divided into the foreground region and the background region according to the extremum grayscale values, so that the foreground region and the background region may be separately processed. For example, the foreground region is assigned with a parameter of 100% transparency, while the foreground region is assigned with a parameter of 0% transparency or a parameter for being partly transparent—the parameters may be flexibly modified.

After determining the pixels included in the foreground region, instead of necessarily storing original pixel color values, colors of the pixels in the foreground region may be adjusted. For example, only Y data is kept from a pixel originally represented in a YCbCr color space where Y, Cb and Cr each has 8 bits. Further, the 8 bits of Y may be processed by a de-graying procedure to discard least significant bits (LSBs) and keep only one to two most significant bits (MSBs).

With reference to FIGS. 4A, 4B, 4C and 4D, a display setting of the subtitle region is further modified according to different applications after having determined the position of the subtitle region, so that the presentation of the image frame may stay unaffected by the subtitle region.

FIG. 4A shows a schematic diagram of a display frame received by a display apparatus. Through the steps of the predetermined horizontal axis, the estimated subtitle region and the pixel distribution of the horizontal section as described above, a subtitle region as shown in FIG. 4B is obtained.

A subtitle region 31 in FIG. 4B comprises an original foreground region 311 and a background region 312. FIG. 4C shows a foreground 312' having undergone a transparency process. Meanwhile, the foreground region 311 may also involve color transformations for adapting to grayscale levels or color depths of the image frame, e.g., transforming from all-white to all-black for adapting to a light-color image frame. Associated details shall be given later.

FIG. 4D shows a previously obtained subtitle region superimposed on a new image frame, which is obtained by proportionally scaling up an image frame to a size of a cinema display system by a display apparatus.

In the present invention, after proportionally adjusting the image frame, the subtitle region is again pasted back into the image frame to obtain a new display frame suitable for the cinema display system. With the above approach, the contents of the image frame are unaffected by the subtitle region pasted back in the image frame as the background region has undergone a transparency process.

Figure 5:
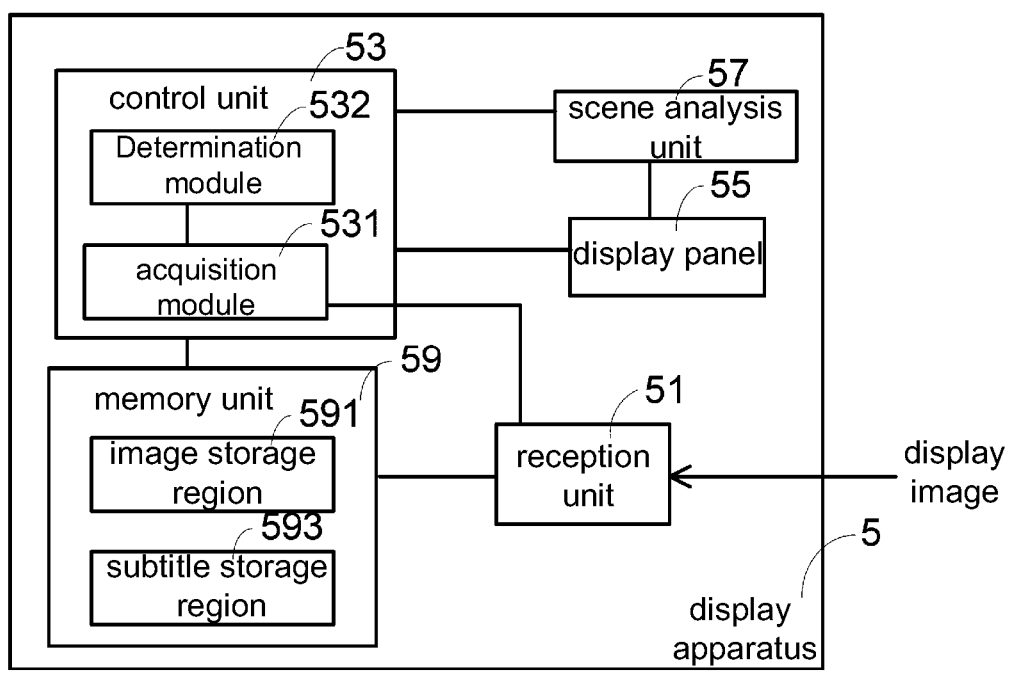
FIG. 5 is a block diagram of a display apparatus according to a preferred embodiment of the present invention.

FIG. 5 shows a block diagram of a display apparatus according to a preferred embodiment of the present invention. Referring to FIG. 5, a display apparatus 5, electrically or signally connected to an image playback apparatus (e.g., a DVD player), receives a display frame having an output width-height ratio, and displays the image frame according to a screen width-height ratio. The output width-height ratio is different from the screen width-height ratio.

In addition to a reception unit 51, a control unit 53 and a display panel 55, the display apparatus 5 may further selectively comprise a memory unit 59 and a scene analysis unit 57.

The reception unit 51, signally connected to the image playback apparatus, receives the display frame from the image playback apparatus. The display frame has an output width-height ratio.

The control unit 53, coupled to the reception unit 51, obtains an image region and a subtitle region from the display frame, and generates a subtitle according to the subtitle region. That is, the control unit 53 determines the subtitle region in the display frame, defines a plurality of pixels having a first extremum grayscale value in the subtitle region as a foreground region, and defines a plurality of pixels having a second extremum grayscale value in the subtitle region as a background region. The foreground region represents the subtitle in the display frame.

The control unit 53 may further comprise an acquisition module 531 and a determination module 532. The acquisition module 531 is coupled to the reception unit 51. The determination module 532 is coupled to the acquisition module 531.

The acquisition module 531 acquires a plurality of horizontal sections from the display frame according to a predetermined horizontal axis.

The determination module 532, electrically connected to the acquisition module 531, determines whether grayscale values of a plurality of pixels included in the horizontal sections display a concentrated distribution or an even distribution, respectively.

Assume that the acquisition module 531 acquires a total of 20 horizontal sections, and, according to a top-down sequence of the display frame, the pixels included in the first and second horizontal sections display an even distribution, while the pixels included in the remaining horizontal sections display a concentrated distribution. Thus, the determination module 532 determines that the display frame below the third horizontal section as the subtitle region.

That is to say, the determination module 532 determines the position of the subtitle region in the display frame according to at least one horizontal section where the grayscale values of the pixels display a concentrated distribution.

Once the position of the subtitle region is confirmed, the determination module 532 defines a plurality of pixels including the first extremum grayscale value in the subtitle region as the foreground region, and defines a plurality of pixels having the second extremum grayscale value in the subtitle region as the background region.

Next, the determination module 532 changes the color transparency of the background region, i.e., transforming the pixels included in the background region from the second extremum grayscale value to transparent. After transforming the pixels in the background region to transparent, only the foreground region representing the subtitle contents are non-transparent. Thus, when later superimposing the subtitle region onto the display frame, only the subtitle contents of the foreground region are displayed so that the display frame kept unaffected by the background region.

The display panel 55, electrically connected to the control unit 53, displays the image frame according to a screen width-height ratio. That is, the image region having a smaller size in the display frame is proportionally scaled up to an image frame having a larger size of the cinema display system. The display panel 55 displays the adjusted subtitle region in the image frame.

The memory unit 59, coupled to the control unit 53 and the reception unit 51, may be divided into a subtitle storage region 593 and an image storage image 591. The image frame is stored in the image storage region 591, and the foreground region and the background region are stored in the subtitle storage region 593.

It should be noted that, a storage format of the foreground ground stored in the memory unit 59 may be adjusted. For example, the pixels included in the foreground region may first undergo de-coloring and de-graying processes by use of the control unit 53, and then be stored in a smaller storage space in the memory unit 59.

The scene analysis unit 57, coupled to the control unit 53, performs a scene analysis on the image frame, and adjusts the display setting of the subtitle region according to a scene analysis result. Further, the scene analysis unit 57 may analyze display characteristics of the display frame according the image frame and information such as the first extremum grayscale value.

For example, when the subtitle contents are in a three-dimensional (3D) format, the scene analysis unit 57 analyzes graphic depths in the image frame, and selects a corresponding 3D format for displaying the subtitle contents according to a position of a speaker in the image frame.

Alternatively, the scene analysis unit 57 may also analyze the image frame to obtain brightness or colors of a predetermined region to accordingly adjust the brightness and colors of the subtitle region. For example, colors of pixels near the subtitle region are analyzed and fed back to the control unit 53 for the control unit 53 to change a color palette setting of the foreground region. For example, when the pixels at the lower part of the image frame are in a lighter color, the color of the foreground region is changed from white to navy so that the subtitle contents in the foreground region may be more easily distinguished from the image frame.

Different from a conventional display apparatus that passively displays contents of a display frame, the display apparatus of the present invention is capable of determining positions of the subtitle region and the display frame. More specifically, according to a preferred embodiment of the present invention, the display apparatus supports a display frame analysis function, and accordingly determines the position of the subtitle region in the display frame to respectively perform image processing on the image frame and the subtitle region. The display apparatus further provides a new display frame according to a scaled-up image frame and the adjusted subtitle region.

Figure 6:
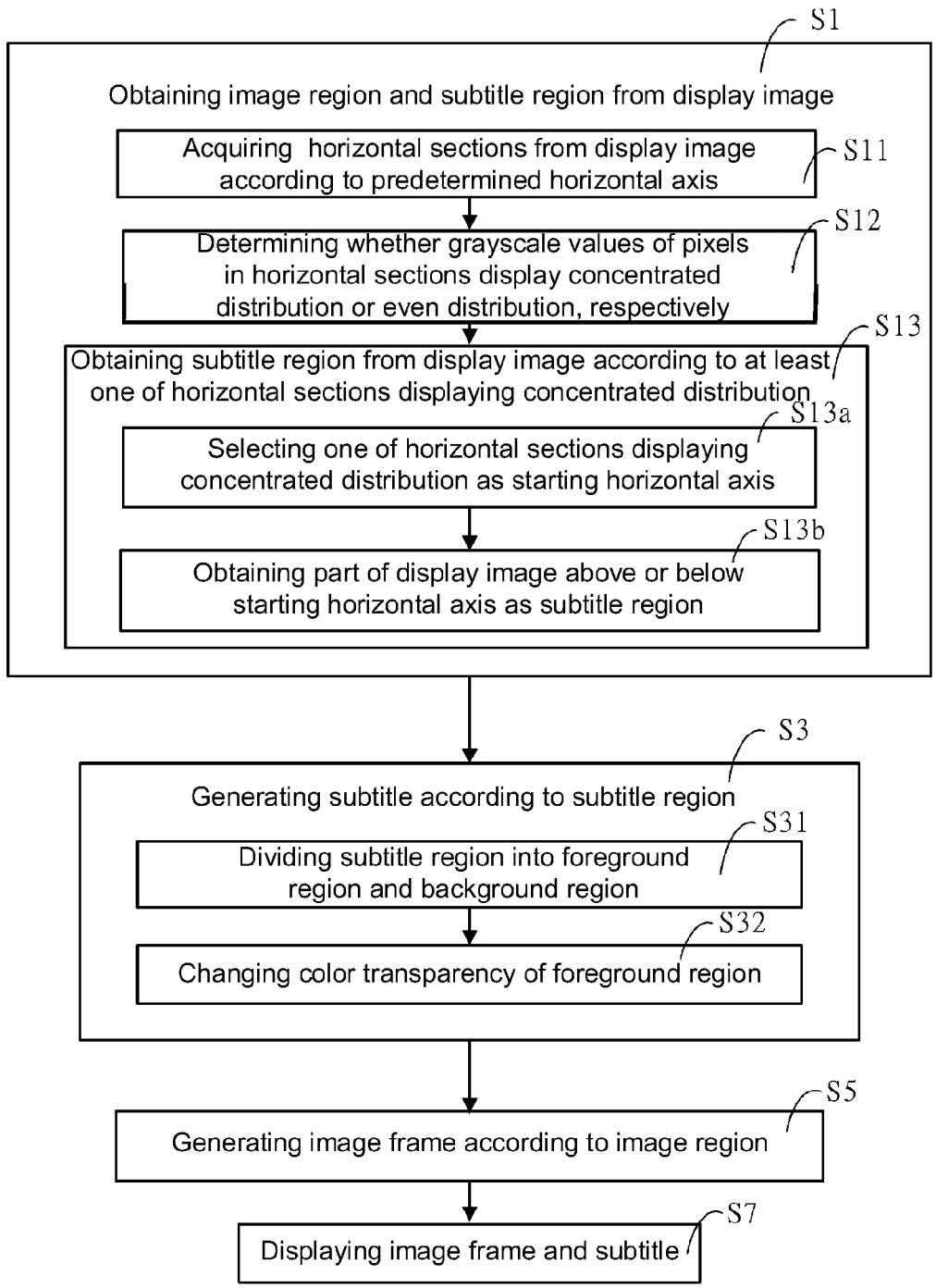
FIG. 6 is a flowchart of a display method applied to a display apparatus according to a preferred embodiment of the present invention.

FIG. 6 shows a flowchart of a display method for a display apparatus according to a preferred embodiment of the present invention. The effects corresponding to the various steps are as given in the foregoing descriptions, and so associated steps of the display method are concluded and summarized as below.

In step S1, an image region and a subtitle region are obtained from a display frame. In step S3, a subtitle is generated according to the subtitle region. In step S5, an image frame is generated according to the image region. In step S7, the image frame and the subtitle are displayed.

In addition to the above steps, other steps may be selectively included. For example, the image frame and the subtitle region are respectively stored, or data of the subtitle region is simplified and then stored.

A purpose of step S1 is to determine the image frame and the subtitle region in the display frame to serve as the basis for subsequent display. For example, a method for determining the subtitle region may comprise the following steps.

In step S11, a plurality of horizontal sections are acquired from the display frame according to a predetermined horizontal axis. In step S12, it is determined whether grayscale values of a plurality of pixels included in the horizontal sections appear as a concentrated distribution or an even distribution, respectively. In step S13, the subtitle region is obtained from the display frame according to at least one of a plurality of horizontal sections displaying a concentrated distribution.

Step S13 may further comprise steps S13a and S13b. In step S13a, one of the horizontal sections displaying the concentrated distribution is selected as a starting horizontal axis. In step S13b, a part of the display frame above or below the starting horizontal axis is obtained as the subtitle region.

Step S3 may further comprise steps S31 and S32. In step S31, the subtitle region is divided into a foreground region and a background region. In step S32, color transparency of the background region is changed.

In step S3, display settings of the foreground region and the background region may be modified. For example, display settings including display dimensions, a 3D depth, colors, subtitle brightness, a font, a size, an outer frame and a position of the foreground may be adjusted, and pixels included in the background region are transformed from a second extremum grayscale value to transparent. In a further application, step S3 may also adjust the display settings of the subtitle region according to a result of the scene analysis performed on the image frame.

In the present invention, the display panel is controlled by the control unit to adjust the display settings of the subtitle region, such as display dimensions, a 3D depth, colors, subtitle brightness, a font, a size, an outer frame and a position of the subtitle region.

Taking the display dimensions for example, the foreground region may be transformed from a two-dimensional (2D) format to a 3D format, or be transformed from a 3D format to a 2D format. When the foreground region is displayed in a 3D format, the corresponding 3D depth of the foreground region may be adjusted.

Apart from the display settings of the subtitle region listed above, it can be easily appreciated by a person having ordinary skill in the art that various other display settings are also available and are also encompassed within the scope of the present invention.

Figure 7A:
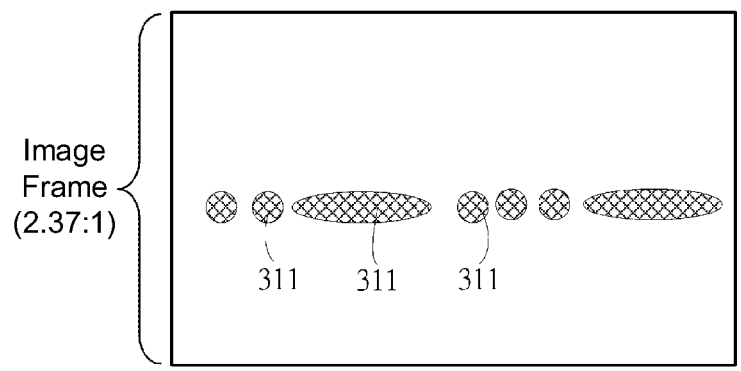
FIG. 7A is a schematic diagram of adjusting a positing of a subtitle region.

FIG. 7A shows a schematic diagram of adjusting a display position of subtitle contents. In the present invention, the position of the subtitle region is not limited to the lower part of the display panel. Thus, as shown in FIG. 7A, the subtitle region may be superimposed on any position of the display frame.

The present invention may further adjust the dimensions of the foreground region. For example, the subtitle contents represented by the foreground region may be transformed from a 2D format to a 3D format.

Once the subtitle contents are selected to be displayed in a 3D format, the present invention may further change the 3D depth of the foreground region, i.e., the foreground region are displayed by different 3D depths according to the contents of the display frame. For example, for characters standing at different positions and speaking, lines spoken by an actor standing at a farther position are displayed in a greater 3D depth, and vice versa.

The display method of the foreground region may change according to different settings of the display apparatus, or set according to user preferences. For example, the foreground region is displayed by a font in a size larger than a predetermined font size.

In another application, to solve an ambiguity issue caused by similar colors of the foreground region and the lower part of the image frame, the display panel may further add an outer frame to the foreground region or dynamically adjust the colors of the foreground region when displaying the subtitle region, so as to more easily distinguish the foreground region from the lower part of the image frame.

Figure 7B:
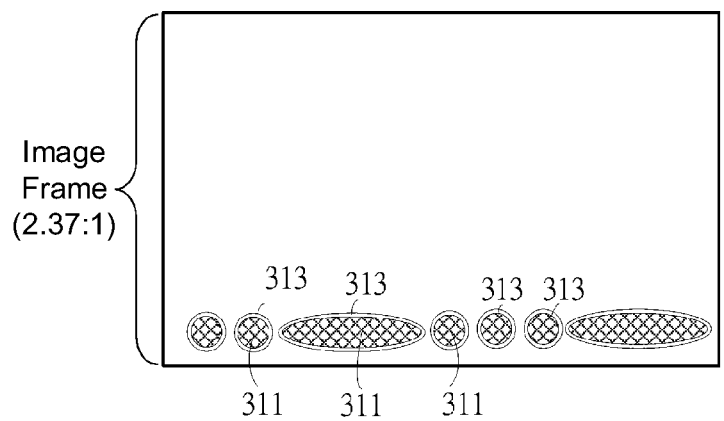
FIG. 7B is a schematic diagram of displaying a foreground region with an outer frame effect.

FIG. 7B shows a schematic diagram of displaying a foreground region with an outer frame effect. The outer frame effect refers to another base color for emphasizing the color of the foreground region apart from the color of the foreground region. For example, for a foreground region in blue, an outer frame 313 can be formed by a bright yellow periphery of the foreground region.

With an outer framing process on the foreground region, a subtitle effect can be further accentuated. Thus, the color of the outer frame 313 may also be dynamically adjusted to reinforce contrast according to actual application requirements.

It is seen from the foregoing descriptions that, through the scene analysis unit, the display apparatus provides an image frame analysis capability. For example, detection and analysis on a human face, a speaking mouth, a complex image or an even region can be performed by the scene analysis unit. On such basis, the foreground region may further be dynamically placed next to a speaker, or at a position that does not affect the frame, or a predetermined fixed position. To further emphasize effects of speech, the outer frame may also be presented in comics as shown in FIG. 7C.

Figure 7C:
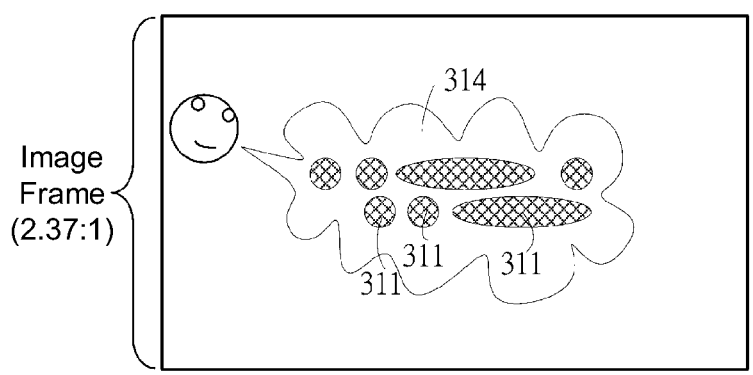
FIG. 7C is a schematic diagram of displaying a foreground region with an emphasized outer frame.

FIG. 7C shows a schematic diagram of displaying subtitle contents with an emphasized outer frame. When adopting such type of outer frame 314, the foreground region correspondingly points towards a speaker in the image frame to allow the audience to better observe the display frame at a glance.

In conclusion, a display method and a display apparatus capable of normally displaying an image frame and subtitle contents are provided by the present invention. When superimposing the subtitle contents on an image frame with the display apparatus and the display method according to the concept of the present invention, the background region first undergoes a transparency process and a presentation method of the foreground region is then adjusted in response to system requirements, thereby providing preferred display effects.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display method, applied to a display apparatus, the display apparatus configured to receive a display frame having an output width-height ratio and display an image frame according to a screen width-height ratio different from the output width-height ratio; the display method comprising:
    obtaining an image region and a subtitle region from the display frame;
    generating a subtitle according to the subtitle region;
    generating the image frame according to the image region; and
    displaying the image frame and subtitle;
    wherein the image region and the subtitle region are pixel-based; and
    wherein the step of obtaining an image region and a subtitle region from the display frame comprises:
        acquiring a plurality of horizontal sections from the display frame according to a predetermined horizontal axis;
        identifying in the horizontal sections having a concentrated distribution of grayscale values; and
        obtaining the subtitle region from the display frame according to at least one of the horizontal sections displaying the concentrated distribution.

2. The display method according to claim 1, wherein the concentrated distribution refers to that the grayscale values of the pixels comprised in one horizontal section comprise a first extremum grayscale value and a second extremum grayscale value.

3. The display method according to claim 1, wherein the horizontal sections are all located at a same side of the predetermined horizontal axis or near the predetermined horizontal axis dividing the display frame.

4. The display method according to claim 1, wherein the step of obtaining the subtitle region from the display frame according to the at least one of the horizontal sections displaying the concentrated distribution comprises:
    selecting one of the horizontal sections displaying the concentrated distribution as a starting horizontal axis; and
    obtaining a part of the display frame below or above the starting horizontal axis as the subtitle region.

5. The display method according to claim 1, wherein the step of generating the subtitle according to the subtitle region comprises:
    dividing the subtitle region into a foreground region and a background region; and
    changing color transparency of the background region.

6. The display method according to claim 5, wherein the foreground region refers to a plurality of pixels having a first extremum grayscale value in the subtitle region; and
    the background region refers to a plurality of pixels having a second extremum grayscale value in the subtitle region.

7. The display method according to claim 6, wherein the step of changing the color transparency of the background region transforms pixels comprised in the background region from the second extremum grayscale value to transparent.

8. The display method according to claim 5, wherein the step of generating the subtitle according to the subtitle region further comprises:
    performing a scene analysis on the image frame to obtain a three-dimensional (3D) depth and a position of a speaker image, and accordingly adjusting the 3D depth and the position of the subtitle region and adjusting display dimensions, a 3D depth, colors, subtitle brightness, a font, a size, an outer frame or a position of the foreground region.

9. The display method according to claim 5, wherein the step of generating the subtitle according to the subtitle region further comprises:
    performing a scene analysis on the image frame to obtain brightness and a color of a predetermined region, and accordingly adjusting brightness and a color of the subtitle region.

10. The display method according to claim 5, wherein the step of generating the subtitle according to the subtitle region further comprises:
    performing a scene analysis on the image frame, and accordingly adjusting a font, a size and an outer frame of the subtitle region.

11. The display method according to claim 1, wherein the display apparatus comprises a panel, widths of the display frame and the panel are greater than heights of the display frame and the panel, the output width-height ratio is a ratio of the width of the display frame to the height of the display frame, the screen width-height ratio is a ratio of the width of the panel to the height of the panel, and the output width-height ratio is smaller than the screen width-height ratio.

12. A display apparatus, signally connected to an image playback apparatus, the display apparatus configured to receive a display frame having an output width-height ratio and display an image frame according to a screen width-height ratio different from the output width-height ratio; the display apparatus comprising:
- a reception unit, signally connected to the image playback apparatus, for receiving the display frame from the image playback apparatus;
- a control unit, coupled to the reception unit, for obtaining an image region and a subtitle region from the display frame and to generate a subtitle according to the subtitle region; and
- a panel, coupled to the control unit, for generating the image frame according to the image region, and to display the image frame and the subtitle;
- wherein the image region is a pixel-based image and the subtitle region is a pixel-based image; and
- wherein the control unit comprises:
  - a acquisition unit, coupled to the reception unit, for acquiring a plurality of horizontal sections from the display frame according to a predetermined horizontal axis; and
  - a determination module, coupled to the acquisition module, for determining the horizontal sections havin a concentrated distribution of grayscale values; and to obtain the subtitle region from the display frame according to at least one of the horizontal sections displaying the concentrated distribution.

13. The display apparatus according to claim 12, wherein the concentrated distribution refers to that the grayscale values of the pixels comprised in one horizontal section comprise a first extremum grayscale value and a second extremum grayscale value.

14. The display apparatus according to claim 12, wherein the horizontal sections are all located at a same side of the predetermined horizontal axis or near the predetermined horizontal axis dividing the display frame.

15. The display apparatus according to claim 12, wherein the determination module selects one of the horizontal sections displaying the concentrated distribution as a starting horizontal axis, and obtains a part of the display frame below or above the starting horizontal axis as the subtitle region.

16. The display apparatus according to claim 15, wherein the control unit defines a plurality of pixels in the subtitle region having a first extremum grayscale value as a foreground region, defines a plurality of pixels in the subtitle region having a second extremum grayscale value as a background region, and changes color transparency of the background region.

17. The display apparatus according to claim 16, wherein the control unit transforms a plurality of pixels comprised in the background region from the second extremum grayscale value to transparent.

18. The display apparatus according to claim 15, further comprising:
- an analysis unit, configured to perform a scene analysis on the image frame;
- wherein, the control unit further controls the panel to adjust display dimensions, a 3D depth, a color, subtitle brightness, a font, a size, an outer frame or a position of the subtitle region.

19. The display apparatus according to claim 12, wherein widths of the display frame and the panel are greater than heights of the display frame and the panel, the output width-height ratio is a ratio of the width of the display frame to the height of the frame, the screen width-height ratio is a ratio of the width of the panel to the height of the panel, and the output width-height ratio is smaller than the screen width-height ratio.

* * * * *